(12) United States Patent
Feng et al.

(10) Patent No.: US 12,305,772 B2
(45) Date of Patent: May 20, 2025

(54) REVERSIBLE ELECTROMAGNETIC VALVE AND AIR CONDITIONING UNIT HAVING SAME

(71) Applicant: ZHEJIANG DUNAN ARTIFICIAL ENVIRONMENT CO., LTD., Shaoxing (CN)

(72) Inventors: Zhongbo Feng, Shaoxing (CN); Yunjun Xiong, Shaoxing (CN); Zhou Yu, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/512,044

(22) Filed: Nov. 17, 2023

(65) Prior Publication Data

US 2024/0093801 A1  Mar. 21, 2024

Related U.S. Application Data

(63) Continuation of application No. PCT/CN2022/093885, filed on May 19, 2022.

(30) Foreign Application Priority Data

May 20, 2021 (CN) .......................... 202121093980.6

(51) Int. Cl.
*F16K 31/363* (2006.01)
*F16K 3/02* (2006.01)
(Continued)

(52) U.S. Cl.
CPC .......... *F16K 31/363* (2013.01); *F16K 3/0254* (2013.01); *F16K 3/029* (2013.01);
(Continued)

(58) Field of Classification Search
CPC ........ F16K 31/363; F16K 3/24; F16K 3/0254; F16K 3/029; F16K 3/18; F16K 3/314; F16K 31/122
(Continued)

(56) References Cited

U.S. PATENT DOCUMENTS 2,129,938 A * 9/1938 Johnson ................ F16K 31/406
251/30.02
3,808,829 A * 5/1974 Peruglia ................ F25B 41/20
251/30.02
(Continued)

FOREIGN PATENT DOCUMENTS

CN       105090011 A    11/2015
CN       106286896 A     1/2017
(Continued)

OTHER PUBLICATIONS

International Search Report of PCT/CN2022/093885.
European search report of EP22804040.8.
Notice of Reasons for Refusal of JP2023567050.

Primary Examiner — John Bastianelli

(57) ABSTRACT

A reversible electromagnetic valve and an air conditioning unit are provided. The reversible electromagnetic valve includes a valve body and a valve core assembly, the valve body is provided with a valve cavity, and the valve core assembly is arranged in the valve cavity. The valve core assembly includes a piston and a connecting rod, wherein the piston is provided with a connecting hole, one end of the connecting rod penetrates through the connecting hole and is connected with the piston, and the connecting rod includes (Continued)

a tapered section, an outer diameter of which gradually changes along an axial direction of the connecting rod component. The tapered section extends into the connecting hole and abuts against an inner wall of the connecting hole, so that the connecting rod component is sealed and connected with the piston.

12 Claims, 7 Drawing Sheets

(51) Int. Cl.
 *F16K 3/18* (2006.01)
 *F16K 3/314* (2006.01)
 *F16K 31/122* (2006.01)
 *F16K 3/24* (2006.01)

(52) U.S. Cl.
 CPC ............... *F16K 3/18* (2013.01); *F16K 3/314* (2013.01); *F16K 31/122* (2013.01); *F16K 3/24* (2013.01)

(58) Field of Classification Search
 USPC ............ 251/30.01–30.5, 62, 63.5, 63.6
 See application file for complete search history.

(56) References Cited

U.S. PATENT DOCUMENTS

| | | | | |
|---|---|---|---|---|
| 6,805,328 | B2* | 10/2004 | Filkovski | F16K 31/124 |
| | | | | 251/30.05 |
| 8,800,957 | B2* | 8/2014 | Saine | F16K 31/40 |
| | | | | 251/30.01 |
| 2002/0033461 | A1* | 3/2002 | Kajitani | F16K 1/52 |
| | | | | 251/63.6 |
| 2005/0005966 | A1 | 1/2005 | Biester | |
| 2017/0241450 | A1 | 8/2017 | Neff et al. | |
| 2020/0131994 | A1 | 4/2020 | Carpenter et al. | |

FOREIGN PATENT DOCUMENTS

| | | |
|---|---|---|
| CN | 205956405 U | 2/2017 |
| CN | 206368986 U | 8/2017 |
| CN | 107120329 A | 9/2017 |
| CN | 207316111 U | 5/2018 |
| CN | 207470843 U | 6/2018 |
| CN | 111183307 A | 5/2020 |
| CN | 210950115 U | 7/2020 |
| CN | 213206723 U | 5/2021 |
| FR | 1196093 A | 11/1959 |
| JP | 2007085494 A | 4/2007 |
| JP | 2016164438 A | 9/2016 |
| JP | 6378114 B2 | 8/2018 |
| WO | WO2019072622 A1 | 4/2019 |

* cited by examiner

REVERSIBLE ELECTROMAGNETIC VALVE AND AIR CONDITIONING UNIT HAVING SAME

CROSS-REFERENCE TO RELATED APPLICATIONS

This application is a continuation of international patent application No. PCT/CN2022/093885, filed on May 19, 2022, which itself claims priority to Chinese patent application No. 202121093980.6, filed on May 20, 2021, and titled "REVERSIBLE ELECTROMAGNETIC VALVE AND AIR CONDITIONING UNIT HAVING SAME". The content of the above identified application is hereby incorporated herein in their entireties by reference.

TECHNICAL FIELD

The present disclosure relates to the field of refrigeration technology, and in particular, to a reversible electromagnetic valve and an air conditioning unit having same.

BACKGROUND

In the related art, an air conditioning unit usually works in two modes, namely, a cooling mode and a heating mode. Flow directions of media in the two modes are different, but in the two modes of cooling and heating, it is usually necessary to set a cutoff member to control the communication of pipelines.

However, in the related art, a poor sealing between a connecting rod of the reversible electromagnetic valve and a piston of the reversible electromagnetic valve causes a leakage of the medium and mistaken flow of the medium.

SUMMARY

According to various embodiments of the present application, a reversible electromagnetic valve is provided.

The present disclosure provides a reversible electromagnetic valve. The reversible electromagnetic valve includes a valve body and a valve core assembly. Two sides of the valve body are respectively provided with a first communication port and a second communication port. The valve body is provided with a valve cavity, the valve core assembly component is arranged in the valve cavity, and the valve core assembly is capable of sliding in the valve cavity, so that the first communication port and the second communication port are in communication with each other or out of communication with each other. The valve core assembly includes a piston and a connecting rod component, the piston is provided with a connecting hole, and an end of the connecting rod component penetrates through the connecting hole and is connected with the piston. The connecting rod component includes a tapered section, an outer diameter of which gradually changes along an axial direction of the connecting rod component. The tapered section of the connecting rod component extends into the connecting hole and abuts against an inner wall of the connecting hole, so that the connecting rod component is sealed and connected with the piston.

In some embodiments, the tapered section is provided with a first end and a second end opposite to each other. The first end of the tapered section is arranged adjacent to the first communication port relative to the second end of the tapered section, an outer diameter of the first end of the tapered section is denoted as D1, an outer diameter of the second end of the tapered section is denoted as D2, and the outer diameter D1 of the first end is greater than the outer diameter D2 of the second end. The piston includes a piston bowl, the outer side wall of the piston bowl abuts against the inner wall of the valve body, and the connecting hole includes a first hole located on the piston bowl. An inner diameter of the first hole is denoted as D3. The outer diameter D1 of the first end, the outer diameter D2 of the second end and the inner diameter D3 of the first hole satisfy following relationship: $D1>D3>D2$.

In some embodiments, the piston further includes an intermediate baffle, and the piston bowl includes a first bowl and a second bowl. The first bowl and the second bowl are respectively arranged at two sides of the intermediate baffle, and the connecting hole further includes a second hole in communication with the first hole and located on the intermediate baffle, an inner diameter of the second hole is denoted as D4, and the inner diameter D4 of the second hole is greater than the outer diameter D1 of the first end.

In some embodiments, the piston further includes a first baffle and a second baffle. The first baffle is arranged in the first bowl, the second baffle is arranged in the second bowl, and the connecting rod component penetrates through the first baffle and the second baffle respectively.

In some embodiments, the piston further includes a first elastic piece which is arranged in the piston bowl and abuts against a side wall of the piston bowl.

In some embodiments, the valve core assembly further includes a nut and an end of the connecting rod component protrudes from the connecting hole and is in threaded connection with the nut.

In some embodiments, the valve cavity is internally provided with an intermediate end cover. The valve cavity is divided into a circulation cavity and a pressure cavity by the intermediate end cover. The circulation cavity is in communication with the first communication port and the second communication port. The pressure cavity is divided into a first cavity and a second cavity by the piston. A pressure difference is formed between the first cavity and the second cavity to push the piston to move.

In some embodiments, the valve core assembly further includes a slider, and the connecting rod component includes a connecting rod and a guide frame which are connected with each other. The guide frame is sleeved outside the slider; the piston is connected to an end of the connecting rod away from the slider; and the slider is capable of sliding under drive of the piston and sealing the first communication port and the second communication port.

In some embodiments, one end of the guide frame is provided with a limiting groove, and one end of the connecting rod is provided with a positioning groove, and the guide frame extends into the positioning groove, and a part of an outer side wall of the connecting rod abuts against a side wall of the limiting groove.

The present disclosure further provides the following technical scheme:

an air conditioning unit including the above reversible electromagnetic valve is provided.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those inventions disclosed herein, reference may be made to one or more attached drawings. Additional details or examples used to describe the drawings should not be considered as limiting the scope of any of the disclosed inventions, currently described embodiments and/or examples, and currently understood best modes of these inventions.

Figure 1:
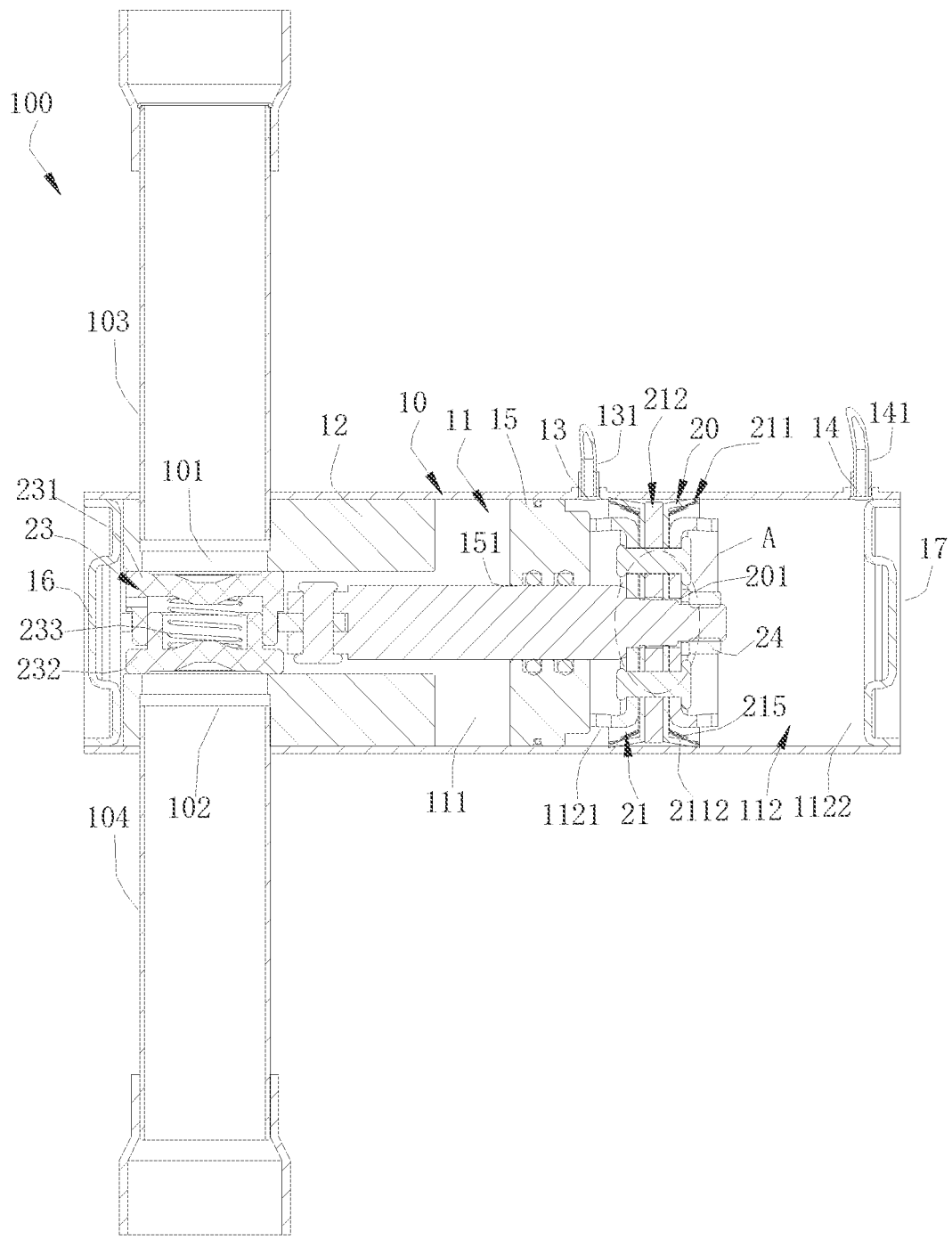
FIG. 1 is a sectional view of a reversible electromagnetic valve according to one or more embodiments.

REFERENCE SIGNS ARE AS FOLLOWS 100 represents a reversible electromagnetic valve or an electromagnetic valve; 10 represents a valve body; 101 represents a first communication port; 102 represents a second communication port; 103 represents a first connecting pipe; 104 represents a second connecting pipe; 11 represents a valve cavity; 111 represents a circulation cavity; 112 represents a pressure cavity; 1121 represents a first cavity; 1122 represents a second cavity; 12 represents a valve seat; 13 represents a third communication port; 131 represents a first capillary; 14 represents a fourth communication port; 141 represents a second capillary; 15 represents an intermediate end cover; 151 represents a mounting hole; 16 represents a first end cover; 17 represents a second end cover; 20 represents a valve core assembly; 21 represents a piston; 201 represents a connecting hole; 211 represents a piston bowl; 2111 represents a first bowl; 2112 represents a second bowl; 2113 represents a first hole; 212 represents an intermediate baffle; 2121 represents a second hole; 213 represents a first baffle; 214 represents a second baffle; 215 represents a first elastic piece; 22 represents a connecting rod component; 221 represents a connecting rod; 2211 represents a tapered section; 2011 represents a first end; 2012 represents a second end; 2212 represents a positioning groove; 222 represents a guide frame; 2221 represents a limiting groove; 23 represents a slider; 231 represents a first part; 232 represents a second part; 233 represents a second elastic piece; 24 represents a nut; and 300 represents an air conditioning unit.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is said to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Referring to FIG. 1 to FIG. 9, the present disclosure provides a reversible electromagnetic valve 100 (hereinafter referred to as an electromagnetic valve 100), which is installed in an air conditioning unit and used for controlling the communication of pipelines or out of communication of pipelines.

The electromagnetic valve 100 of the present application can be used in the air conditioning unit that have bidirectional working modes, for example, it can be installed in the air conditioning unit that have both the cooling mode and the heating mode.

Referring to FIG. 1, the electromagnetic valve 100 includes a valve body 10 and a valve core assembly 20. The valve body 10 includes a valve cavity 11. The valve body 10 is provided with a first communication port 101 and a second communication port 102. The valve core assembly 20 is installed in the valve cavity 11 and is capable of sliding in the valve cavity 11, so that the first communication port 101 and the second communication port 102 are in communication with each other or out of communication with each other.

Specifically, the valve body 10 is provided with a valve seat 12, which is fixed in the valve body 10, and a part of the valve core assembly 20 can move in the valve seat 12. The first communication port 101 and the second communication port 102 respectively penetrate through the valve seat 12.

A first connecting pipe 103 is arranged in the first communication port 101, and a second connecting pipe 104 is arranged in the second communication port 102. The first connecting pipe 103 and the second connecting pipe 104 are respectively connected with pipelines of the air conditioning unit.

An intermediate end cover 15 is arranged in the valve cavity 11, and a first end cover 16 and a second end cover 17 are respectively arranged at both ends of the valve body 10. A circulation cavity 111 is defined by the first end cover 16 and the intermediate end cover 15, and a pressure cavity 112 is defined by the intermediate end cover 15 and the second end cover 17. The intermediate end cover 15 cooperates with the valve core assembly 20 to divide the pressure cavity 112 into a first cavity 1121 and a second cavity 1122. When the electromagnetic valve 100 is in an open state, the circulation cavity 111 is in communication with the first communication port 101 and the second communication port 102. There is a pressure difference between the media in the first cavity 1121 and the media of the second cavity 1122 to make the valve core assembly 20 to move, thereby controlling the communication of the first communication port 101 and the second communication port 102 and out of communication therebetween, realizing the bidirectional function, simplifying the pipeline of the air conditioning unit and reducing the cost.

The intermediate end cover 15 is provided with a mounting hole 151. A part of the valve core assembly 20 passes through the mounting hole 151, a part of the valve core assembly 20 is located on a side of the intermediate end cover 15 adjacent to the first end cover 16, and a part of the valve core assembly 20 is located on a side of the intermediate end cover 15 adjacent to the second end cover 17.

The valve body 10 is provided with a third communication port 13 and a fourth communication port 14, and the third communication port 13 is in communication with the first cavity 1121. The fourth communication port 14 is in communication with the second cavity 1122. The third communication port 13 is provided with a first capillary 131 and the fourth communication port 14 is provided with a second capillary 141. The first capillary 131 and the second capillary 141 are connected to the pilot valve, so that a pressure difference is formed between two sides of the valve core assembly 20 to make the valve core assembly 20 move.

The valve core assembly 20 includes a connecting rod component 22 and a slider 23, the slider 23 is connected with the connecting rod component 22, and an end of the connecting rod component 22 penetrates through the mounting hole 151.

Figure 4:
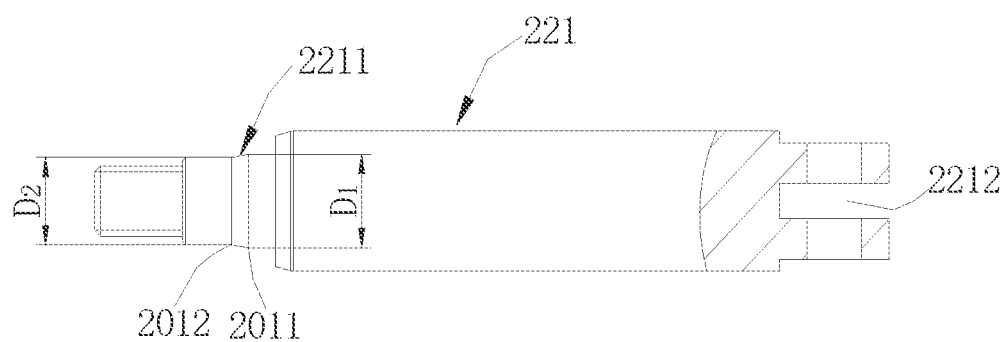
FIG. 4 is a partial cross-sectional view of a connecting rod according to one or more embodiments.
Figure 5:
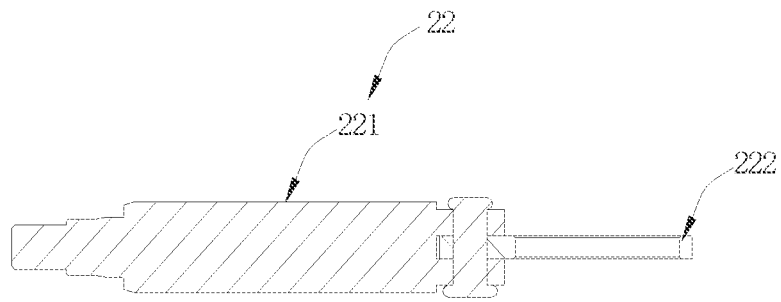
FIG. 5 is a sectional view of a connecting rod component according to one or more embodiments.
Figure 6:
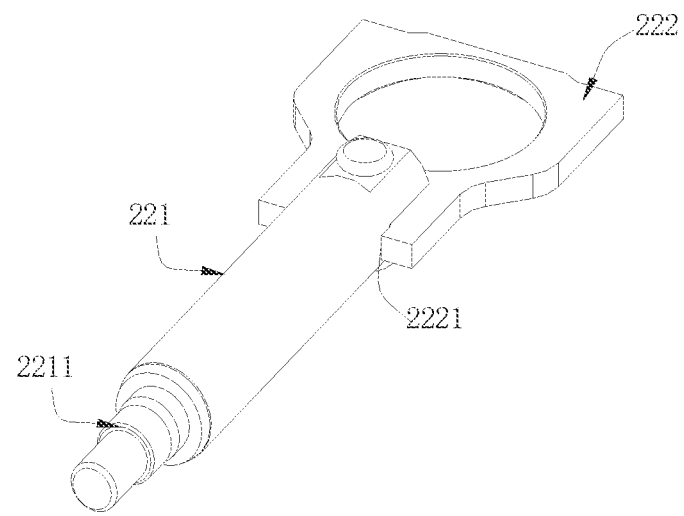
FIG. 6 is a stereograph view of a connecting rod component according to one or more embodiments.
Figure 7:
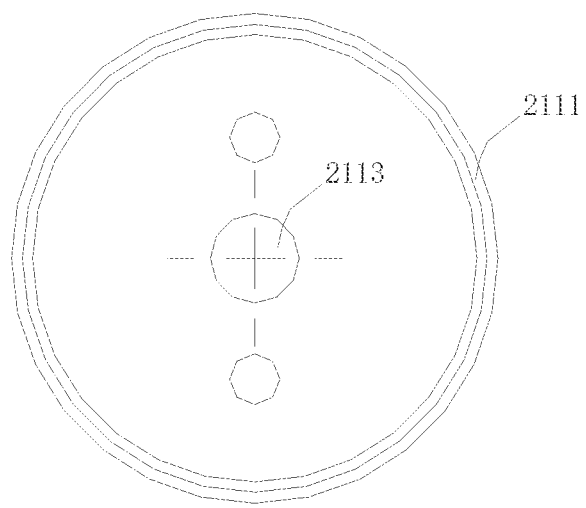
FIG. 7 is a top view of a first bowl according to one or more embodiments.
Figure 8:
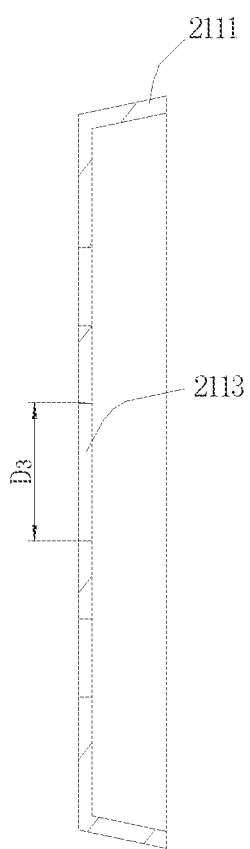
FIG. 8 is a left view of a first bowl according to one or more embodiments.
Figure 9:
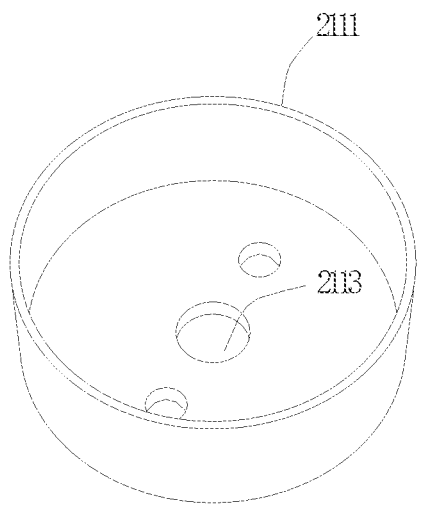
FIG. 9 is a stereograph view of a first bowl according to one or more embodiments.

Referring to FIG. 4 to FIG. 6, the connecting rod component 22 includes a connecting rod 221 and a guide frame 222 which are connected with each other, and the guide frame 222 is sleeved outside the slider 23. It can guide the slider 23 and prevent the slider 23 from tilting during the movement under an impact of the medium, thereby a possibility of affecting the sealing performance of the slider 23 blocking the first communication port 101 and the second communication port 102 can be avoided. At the same time, it can prevent the slider 23 from inclining to interfere with an inner wall of the valve cavity 11.

One end of the connecting rod 221 facing the guide frame 222 is provided with a positioning groove 2212. One end of the guide frame 222 adjacent to the connecting rod 221 is provided with a limiting groove 2221, and the guide frame 222 extends into the positioning groove 2212. The positioning groove 2212 can limit a depth that the guide frame 222 extends into the connecting rod 221. A part of the outer side wall of the connecting rod 221 abuts against a side wall of the limiting groove 2221, and the limiting groove 2221 is configured to limit the connecting rod 221 to ensure coaxiality of the connecting rod 221 and the guide frame 222.

With this arrangement, the connecting rod 221 can be positioned, and the coaxiality between the connecting rod 221 and the guide frame 222 can be enhanced.

Referring to FIG. 1, the slider 23 includes a first part 231 and a second part 232, and the first part 231 abuts against the second part 232. The first part 231 is arranged adjacent to the first communication port 101 and the second part 232 is arranged adjacent to the second communication port 102. The first part 231 can block/seal the first communication port 101 and the second part 232 can block/seal the second communication port 102.

Specifically, a second elastic piece 233 is arranged between the first part 231 and the second part 232, and one end of the second elastic piece 233 abuts against the first part 231, the other end of the second elastic piece 233 abuts against the second part 232. And the second elastic piece 233 is configured to make the first part 231 and the second part 232 be in contact with an end face of the first communication port 101 and an end face of the second communication port 102 respectively, so as to strengthen the sealing/blocking performance.

The valve core assembly 20 further comprises a piston 21, which is arranged in the pressure cavity 112 and connected to one end of the connecting rod 221 away from the slider 23. The piston 21 abuts against an inner wall of the valve cavity 11 to separate the first cavity 1121 from the second cavity 1122.

Furthermore, the piston 21 is provided with a connecting hole 201, and the connecting rod 221 penetrates through the connecting hole 201 and is connected with the piston 21. The connecting rod 221 includes a tapered section 2211, and an outer diameter of the tapered section 2211 of the connecting rod 221 gradually changes along an axial direction of the connecting rod 221. The taped section 2211 of the connecting rod 221 passes through the connecting hole 201, and the taped section 2211 of the connecting rod 221 can abut against an inner wall of the connecting hole 201 to form a conical seal, so that the connecting rod 221 is sealed and connected with the piston 21.

With this arrangement, the connecting rod component 22 and the piston 21 can be sealingly connected, so as to prevent a leakage of the medium and flowing in mistake of the medium.

The piston 21 includes a piston bowl 211 with a bowl shape, and an outer side wall of the piston bowl 211 can abut against the inner wall of the valve cavity 11, so that the piston 21 can slide hermetically/sealingly in the valve cavity 11. The piston bowl 211 can be made of polytetrafluoroethylene.

Figure 2:
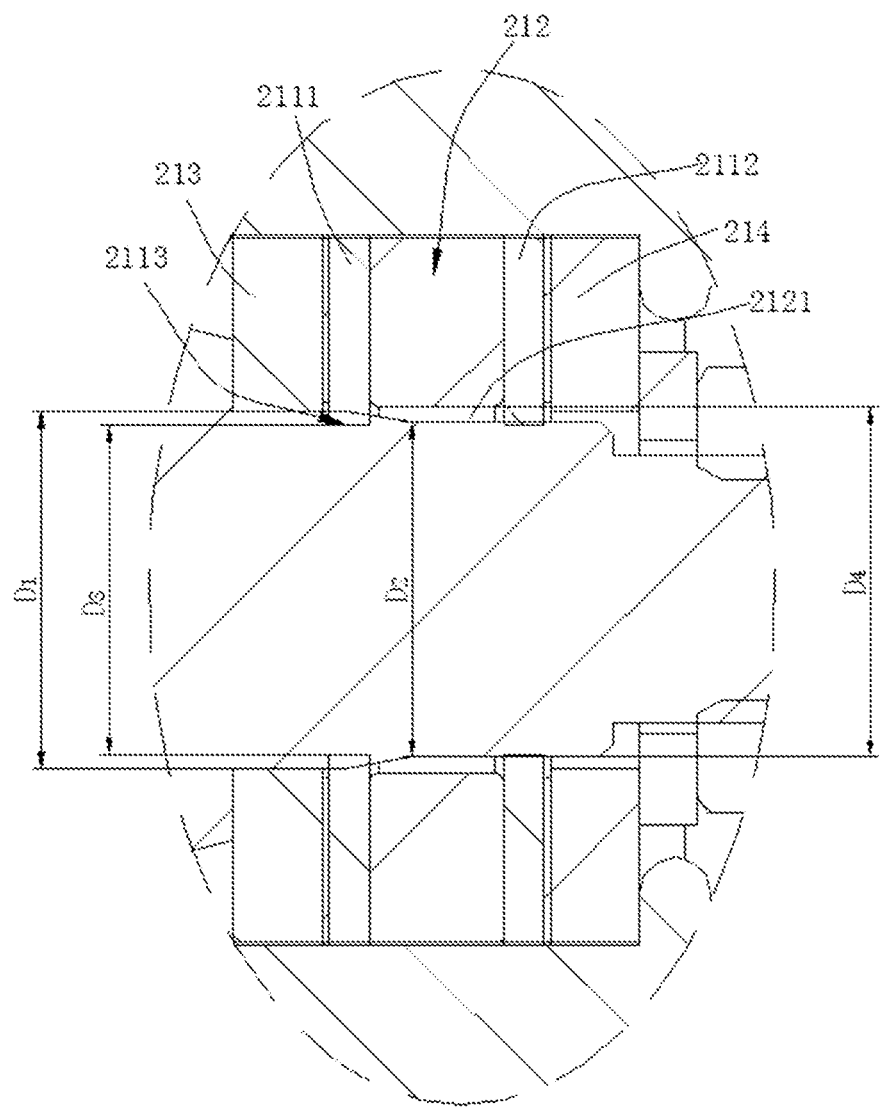
FIG. 2 is an enlarged view of portion A in FIG. 1.

Referring to FIG. 2 and FIG. 4, the connecting hole 201 includes a first hole 2113 located on the piston bowl 211. The tapered section 2211 is frustum-shaped and has a first end 2011 and a second end 2012 opposite to each other. The first end 2011 is arranged adjacent to the first communication port 101 relative to the second end 2012. An outer diameter of the first end 2011 of the tapered section 2211 is denoted as D1, an outer diameter of the second end 2012 of the tapered section 2211 is denoted as D2. The outer diameter D1 of the first end 2011 is greater than the outer diameter D2 of the second end 2012. An inner diameter of the first hole 2113 is denoted as D3. The outer diameter D1 of the first end 2011, the outer diameter D2 of the second end 2012 and the inner diameter D3 of the first hole 2113 satisfy following relationship: D1>D3>D2. An inner wall of the first hole 2113 interferes with the tapered section 2211, thereby enhancing the sealing performance.

In this way, the piston bowl 211 can interfere with the tapered section 2211, and the sealing effect can be improved.

The piston bowl 211 includes a first bowl 2111 and a second bowl 2112, both of which are bowl-shaped. The piston 21 also includes an intermediate baffle 212, and the first bowl 2111 and the second bowl 2112 are respectively arranged at two sides of the intermediate baffle 212 and are arranged back to back. The intermediate baffle 212 plays a connecting and supporting role for the first bowl 2111 and the second bowl 2112.

The first bowl 2111 is located adjacent to the slider 23, and the first hole 2113 is located on the first bowl 2111, that is, the first bowl 2111 interferes with the tapered section 2211. An inner diameter of the second bowl 2112 is equal to that of the first bowl 2111, that is to say, the second bowl 2112 and the first bowl 2111 have the same structure and size, which is convenient for processing.

The connecting hole 201 further includes a second hole 2121 in communication with the first hole 2113. The second hole 2121 is located on the intermediate baffle 212. An inner diameter of the second hole 2121 is denoted as D4. The inner diameter D4 of the second hole 2121 is greater than the outer diameter D1 of the first end 2011. Because the intermediate baffle 212 is made of stainless steel, the intermediate baffle 212 and the connecting rod 221 are arranged at intervals, to prevent the intermediate baffle 212 from interfering with the taped section 2211, thus a possibility of affecting the sealing performance of the piston bowl 211 and the taped section 2211 is avoided.

The intermediate baffle 212 and the connecting rod component 22 are arranged at intervals, so as to prevent the intermediate baffle 212 from interfering with the connecting rod component 22 and a possibility of affecting the sealing performance of the piston bowl 211 and the connecting rod component 22 is avoided.

The piston 21 also includes a first baffle 213 and a second baffle 214. The first baffle 213 is located in the first bowl 2111 and the first cavity 1121. The second baffle 214 is located in the second bowl 2112 and in the second cavity 1122. The connecting rod 221 passes through the first baffle 213 and the second baffle 214 respectively. The first baffle 213 can abut against the intermediate end cover 15, which plays a stop role when the reversible electromagnetic valve is closed. The second baffle 214 can abut against the second end cover 17, which plays a stop role when the reversible electromagnetic valve is opened. The first baffle 213, the first bowl 2111, the intermediate baffle 212, the second bowl 2112 and the second baffle 214 are connected by screws or rivets.

With this arrangement, the strength of the piston 21 can be enhanced.

The piston 21 also includes a first elastic piece 215, which is arranged in the piston bowl 211 and abuts against an inner wall of the piston bowl 211, and can enhance a sealing effect of the piston bowl 211. In this embodiment, the piston 21 also includes two first elastic pieces 215, which are respectively arranged in the first bowl 2111 and the second bowl 2112.

With this arrangement, a sealing performance between the piston bowl 211 and the valve cavity 11 can be enhanced.

In an embodiment, the first elastic piece 215 is an annular toothed spring, which can enhance the elasticity.

Figure 3:
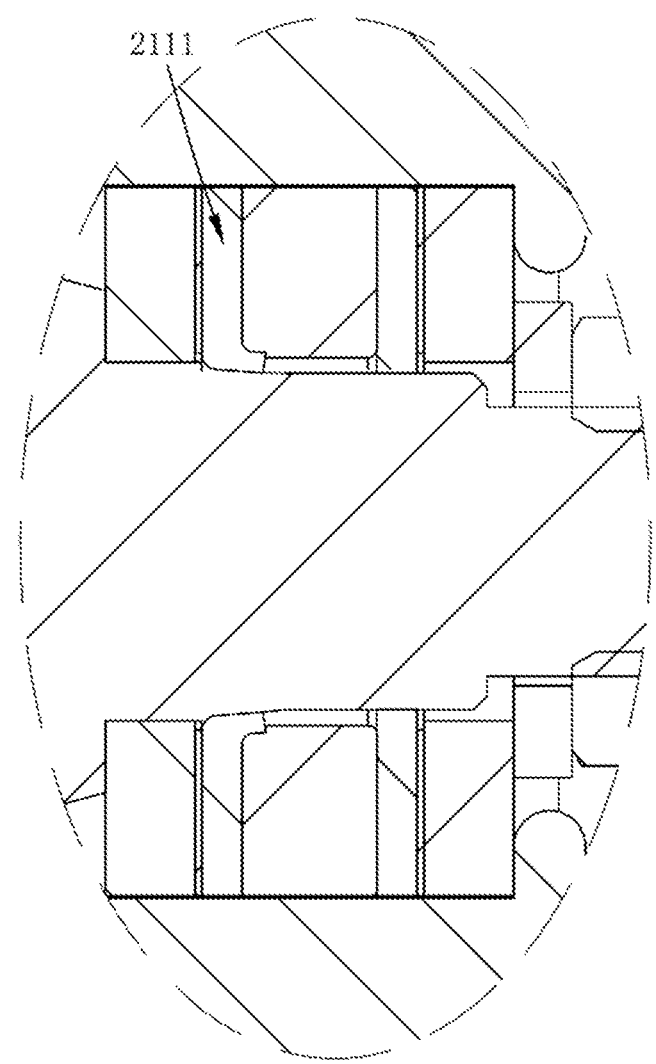
FIG. 3 is a schematic view of a first bowl which is deformed when a nut is tightened according to one or more embodiments.

The valve core assembly 20 further includes a nut 24, which is arranged in the second cavity 1122, and the connecting rod 221 extends from the connecting hole 201 and is screwed with the nut 24. Referring to FIG. 3, when one end of the connecting rod 221 is screwed on the nut 24, the tapered section 2211 presses an inner wall of the first hole 2113. An edge of the first bowl 2111 is turned over towards the intermediate baffle 212, and a turn-up of the first bowl 2111 fills a gap between the intermediate baffle 212 and the connecting rod 221, so that the connecting rod 221 is sealed and connected with the piston 21.

In this way, the connection between the connecting rod component 22 and the piston 21 can be facilitated, and when the connecting rod component 22 is screwed into the nut 24, an interference part between the first hole 2113 and the connecting rod component 22 of the piston bowl 211 can be deformed to fill a gap between the intermediate baffle 212 and the connecting rod component 22.

The electromagnetic valve 100 further includes a pilot valve (not shown), which is arranged outside the valve seat 12 and connected with the first capillary 131 and the second capillary 141. Through a reverse of the pilot valve, the pressure difference between the two sides of the piston 21 is controlled, thereby pushing the piston 21.

Figure 10:
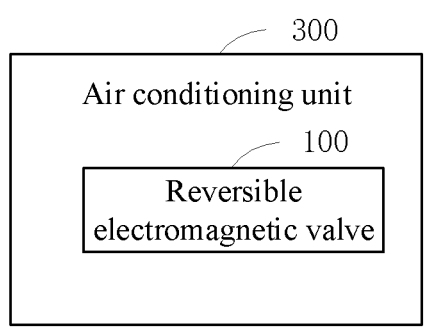
FIG. 10 is a schematic view of a relationship between an air conditioning unit and a reversible electromagnetic valve according to one or more embodiments.

Referring to FIG. 10, the present disclosure further provides an air conditioning unit 300 including the reversible electromagnetic valve 100.

In the working process, when the electromagnetic valve 100 needs to be closed, the high-pressure medium is introduced into the second cavity 1122 from the second capillary 141 through reverse of the pilot valve. The medium in the first cavity 1121 flows out from the first capillary 131, thus pushing the piston 21 to move towards the valve seat 12, and the slider 23 can block/seal the first communication port 101 and the second communication port 102. When the reversible electromagnetic valve 100 needs to be turned on, the pilot valve can reverse a flowing direction of the medium, and high-pressure medium is introduced into the first cavity 1121 from the first capillary 131. The medium in the second cavity 1122 flows out from the second capillary 141, thus pushing the piston 21 to move away from the valve seat 12 and making the first communication port 101 and the second communication port 102 unsealed or unblocked by the slider 23. When the air conditioning unit 300 switches from the cooling mode to the heating mode or from the heating mode to the cooling mode, the flow direction of the medium will be reversed, and the reversible electromagnetic valve 100 can still work normally.

In this present disclosure, the tapered section 2211 is arranged on the connecting rod 221, and the tapered section 2211 abuts against an inner wall of the connecting hole 201, so that the tapered section 2211 and the connecting hole 201 form a conical seal, and the sealing performance is improved.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A reversible electromagnetic valve, comprising a valve body and a valve core assembly, wherein two sides of the valve body are respectively provided with a first communication port and a second communication port, the valve body is provided with a valve cavity, the valve core assembly component is arranged in the valve cavity, and the valve core assembly is capable of sliding in the valve cavity, so that the first communication port and the second communication port are in communication with each other or out of communication with each other;

the valve core assembly comprises a piston and a connecting rod component, the piston is provided with a connecting hole, and an end of the connecting rod component penetrates through the connecting hole and is connected with the piston, the connecting rod component comprises a tapered section, an outer diameter of which gradually changes along an axial direction of the connecting rod component, and the tapered section of the connecting rod component extends into the connecting hole and abuts against an inner wall of the connecting hole, so that the connecting rod component is sealed and connected with the piston;

the tapered section of the connecting rod component is provided with a first end and a second end opposite to each other, the first end of the tapered section is arranged adjacent to the first communication port relative to the second end of the tapered section, an outer diameter of the first end of the tapered section is denoted as D1, an outer diameter of the second end of the tapered section is denoted as D2, the outer diameter D1 of the first end of the tapered section is greater than the outer diameter D2 of the second end of the tapered section, the piston comprises a piston bowl, an outer side wall of the piston bowl abuts against an inner wall of the valve body, and the connecting hole comprises a first hole located on the piston bowl, an inner diameter of the first hole is denoted as D3, and the outer diameter D1 of the first end, the outer diameter D2 of the second end and the inner diameter D3 of the first hole satisfy following relationship: D1>D3>D2;

the piston further comprises an intermediate baffle, and the piston bowl comprises a first bowl and a second bowl, the first bowl and the second bowl are respectively arranged at two sides of the intermediate baffle, and the connecting hole further comprises a second hole in communication with the first hole and located on the intermediate baffle, an inner diameter of the second hole is denoted as D4, and the inner diameter D4 of the second hole is greater than the outer diameter D1 of the first end.

2. The reversible electromagnetic valve of claim 1, wherein the piston further comprises a first baffle and a second baffle, the first baffle is arranged in the first bowl, the second baffle is arranged in the second bowl, and the connecting rod component penetrates through the first baffle and the second baffle respectively.

3. The reversible electromagnetic valve of claim 1, wherein the piston further comprises a first elastic piece which is arranged in the piston bowl and abuts against side walls of the first bowl and the second bowl of the piston bowl.

4. The reversible electromagnetic valve of claim 1, wherein the valve core assembly further comprises a nut and an end of the connecting rod component protrudes from the connecting hole and is in threaded connection with the nut.

5. A reversible electromagnetic valve, comprising a valve body and a valve core assembly, wherein two sides of the valve body are respectively provided with a first communication port and a second communication port, the valve body is provided with a valve cavity, the valve core assembly component is arranged in the valve cavity, and the valve core assembly is capable of sliding in the valve cavity, so that the first communication port and the second communication port are in communication with each other or out of communication with each other;

the valve core assembly comprises a piston and a connecting rod component, the piston is provided with a connecting hole, and an end of the connecting rod component penetrates through the connecting hole and is connected with the piston, the connecting rod component comprises a tapered section, an outer diameter of which gradually changes along an axial direction of the connecting rod component, and the tapered section of the connecting rod component extends into the connecting hole and abuts against an inner wall of the connecting hole, so that the connecting rod component is sealed and connected with the piston;

wherein the valve cavity is provided with an intermediate end cover, the valve cavity is divided into a circulation cavity and a pressure cavity by the intermediate end cover, the circulation cavity is in communication with the first communication port and the second communication port, the pressure cavity is divided into a first cavity and a second cavity by the piston, and a pressure difference is formed between the first cavity and the second cavity to push the piston to move; the valve core assembly further comprises a slider, the connecting rod component comprises a connecting rod and a guide frame which are connected with each other; the guide frame is sleeved outside the slider; the piston is connected to an end of the connecting rod away from the slider; and the slider is capable of sliding under drive of the piston and sealing the first communication port and the second communication port.

6. The reversible electromagnetic valve of claim 5, wherein one end of the guide frame is provided with a limiting groove, and one end of the connecting rod is provided with a positioning groove, and the guide frame extends into the positioning groove, and a part of an outer side wall of the connecting rod abuts against a side wall of the limiting groove.

7. An air conditioning unit, comprising a reversible electromagnetic valve, wherein the reversible electromagnetic valve comprises a valve body and a valve core assembly, two sides of the valve body are respectively provided with a first communication port and a second communication port, the valve body is provided with a valve cavity, the valve core assembly is arranged in the valve cavity, and the valve core assembly is capable of sliding in the valve cavity, so that the first communication port and the second communication port are in communication with each other or out of communication with each other;

the valve core assembly comprises a piston and a connecting rod component, the piston is provided with a connecting hole, and an end of the connecting rod component penetrates through the connecting hole and is connected with the piston, the connecting rod component comprises a tapered section, an outer diameter of which gradually changes along an axial direction of the connecting rod, and the tapered section extends into the connecting hole and abuts against an inner wall of the connecting hole, so that the connecting rod is sealed and connected with the piston;

the tapered section of the connecting rod component is provided with a first end and a second end opposite to each other, the first end of the tapered section is arranged adjacent to the first communication port relative to the second end of the tapered section, an outer diameter of the first end of the tapered section is denoted as D1, an outer diameter of the second end of the tapered section is denoted as D2, the outer diameter D1 of the first end of the tapered section is greater than the outer diameter D2 of the second end of the tapered section, the piston comprises a piston bowl, an outer side wall of the piston bowl abuts against an inner wall of the valve body, and the connecting hole comprises a first hole located on the piston bowl, an inner diameter of the first hole is denoted as D3, and the outer diameter D1 of the first end, the outer diameter D2 of the second end and the inner diameter D3 of the first hole satisfy following relationship: D1>D3>D2;

the piston further comprises an intermediate baffle, and the piston bowl comprises a first bowl and a second bowl, the first bowl and the second bowl are respectively arranged at two sides of the intermediate baffle, and the connecting hole further comprises a second hole in communication with the first hole and located on the intermediate baffle, an inner diameter of the second hole is denoted as D4, and the inner diameter D4 of the second hole is greater than the outer diameter D1 of the first end.

8. The air conditioning unit of claim 7, wherein the piston further comprises a first baffle and a second baffle, the first baffle is arranged in the first bowl, the second baffle is arranged in the second bowl, and the connecting rod component penetrates through the first baffle and the second baffle respectively.

9. The air conditioning unit of claim 7, wherein the piston further comprises a first elastic piece which is arranged in the piston bowl and abuts against a side wall of the piston bowl.

10. The air conditioning unit of claim 7, wherein the valve core assembly further comprises a nut and an end of the connecting rod component protrudes from the connecting hole and is in threaded connection with the nut.

11. A air conditioning unit comprising the reversible electromagnetic valve of claim 5.

12. The air conditioning unit of claim 11, wherein one end of the guide frame is provided with a limiting groove, and one end of the connecting rod is provided with a positioning groove, and the guide frame extends into the positioning groove, and a part of an outer side wall of the connecting rod abuts against a side wall of the limiting groove.

* * * * *